United States Patent Office 3,526,667
Patented Sept. 1, 1970

3,526,667
PROCESS FOR ACETAL PREPARATION
Marion E. Hill, Palo Alto, Calif., and Kathryn G. Shipp, Silver Spring, Md., assignors to the United States of America as represented by the Secretary of the Navy
No Drawing. Filed Feb. 15, 1962, Ser. No. 173,592
Int. Cl. C07c 43/00
U.S. Cl. 260—615                   20 Claims

ABSTRACT OF THE DISCLOSURE

Nitroformals prepared by the reaction of nitro alcohols and formaldehyde in the presence of sulfuric acid and useful in solid propellant composition, either as an energy source or as a plasticizer.

---

The invention described herein may be manufactured and used by or for the Government of the United States of America for governmental purposes without the payment of any royalties thereon or therefor.

This invention relates generally to certain novel compositions of matter, and to processes for manufacturing these compositions. In particular, it is directed to negatively substituted formals and to processes for making them.

Formals of nitro-substituted alcohols have been found to be useful explosives because of their high oxygen content. Indeed, formals derived from 2,2,2-trinitroethanol; 2,2-dinitropropanol-1; and 2-fluoro-2,2-dinitroethanol form a new class of high explosives. These and other negatively substituted formals such as polyhalogenated formals also find other uses in the manufacture of explosives or propellants. They may be used, for example, as plasticizers.

The preparation of formals may be represented by the following overall equation:

$$HCHO + 2ROH \rightleftharpoons CH_2(OR)_2 + H_2O \qquad (1)$$

wherein R is an alkyl or aromatic radical. This is an equilibrium reaction and the percentage conversion to the appropriate acetal varies widely depending upon the alcohol employed and the reaction conditions. Catalytic amounts of ferric chloride or mineral acid are sometimes used with or without an inert solvent. Often, excess alcohol serves as the solvent and serves also to shift the equilibrium to the formal side. It has long been known that small amounts of $H_2SO_4$ may be employed as an agent of cleavage so that large amounts of this acid were not employed in carrying out the reaction of Equation 1 lest the equilibrium be displaced to the left. The prior art method of producing formals utilizes the basic properties of the alcohol hydroxyl group and generally proceeds most favorably with the lower alcohols such as, for example, methanol and ethanol. These prior art processes are unsuitable for use with negatively substituted alcohols (alcohols containing nitro groups or other substituents such as halogens) because these substituents decrease the normal reactivity of the hydroxyl group of the alcohol.

Accordingly, the process outlined in Equation 1 either will not work with negatively substituted alcohols or, if it does proceed, the yield will be very low and the reaction times excessively long.

Accordingly, it has long been recognized that the prior art processes are not suitable for producing negatively substituted formals since they require extreme expenditure of time, labor, equipment and materials.

It is an object of this invention to provide a method of producing negatively substituted formals in good yields by simple processes which require only inexpensive and readily available starting materials.

Another object of this invention is to provide a novel acetal formation process for producing acetals of polynitro, polyhalo, and nitrohalo alcohols.

Another object of the invention is to provide a series of polynitro, polyhalo and nitrohalo formals.

A further object of the invention is to provide a method of producing formals by means of the reaction of polynitro alcohols with an aldehyde wherein a conventional agent of cleavage is used as a solvent.

These and many other objects will become more readily apparent when the following specification is read and considered.

Generally, an acetal of relatively low molecular weight and having a basic alkyl group as the alcohol portion undergoes substantially complete cleavage in strong sulfuric acid (80–100%) or fuming sulfuric acid to yield the alcohol and aldehyde moieties. It has been found, however, that stability in sulfuric acid is an unexpected characteristic of acetals of negatively substituted alcohols so that formals in general and acetals of certain alcohols can be prepared readily in strong sulfuric acid. In strong sulfuric acid or fuming sulfuric acid, the equilibrium between the following classes of formals and their alcohol-aldehyde moieties tends to favor the production of the formal: (1) very acidic formals, i.e., formals which do not readily accept a proton, for example, bis(trinitroethyl) formal; (2) formals which are relatively insoluble in sulfuric acid such as bis(trinitroethyl) formal, bis(2,2-dinitropropyl) formal and 2,2,2-trifluoroethyl formal; (3) formals which are relatively insoluble in sulfuric acid but have an equilibrium lying on the side of the formal.

Formals of this type may be produced by a unique reaction of polynitroalcohols, polynitrohalo alcohols and polyhalogen alcohols with formaldehyde in strong sulfuric acid. Thus, a formal fulfilling the enumerated acidity and equilibrium requirements in strong sulfuric may be produced by the following reaction:

$$HCHO + 2RCH_2(OH) \xrightleftharpoons[]{H_2SO_4} (RCH_2O)_2CH_2 + H_2O \qquad (2)$$

wherein R may be a trinitromethyl, trihalomethyl or nitro group or halogen substituted alkyl radical or any combination of nitro and halogen substitutes or other organic groups whose formal is relatively acidic and/or otherwise having a favorable equilibrium in strong sulfuric. A formal such as an ethyl or methyl formal would be completely cleaved in the solvent sulfuric acid while formals of trinitroethanol and similar alcohols can be produced easily by the reaction of Equation 2 since the equilibrium is heavily in favor of the product formal. Thus, by precipitation, extraction, separation, or other means, the desired formal may be removed and obtained as a pure product.

The following examples are given by way of illustration only and are not to be construed as limiting this invention in any manner:

EXAMPLE I

Preparation of bis(trinitroethyl) formal

A solution of 3.62 grams (0.02 mole) trinitroethanol in 5 ml. of concentrated (96%) sulfuric acid was prepared by warming and stirring in a small Erlenmeyer flask. Upon cooling to room temperature, 0.30 gram (0.01 mole) of formaldehyde, as paraformaldehyde, was stirred into the solution. As the paraformaldehyde dissolved, the temperature of the reaction mixture rose to 35° C. and a colorless oil formed as a supernatant liquid. Within a few minutes, this oil began to crystallize into glistening leaflets. The mixture was stirred for 30 minutes and then poured onto flaked ice. The precipitated white crystalline product was filtered, washed with water and dried. The yield was 3.36 grams or 90% of theoretical and had a melting point of 62–63° C. Recrystallization from 50% methanol-water gave a pure white crystalline product melting at 64–65° C.

In this example as in the following examples, commercial paraformaldehyde ("99%"), $HO(CH_2O)_nH$ was used as the source of anhydrous formaldehyde. The paraformaldehyde is easily handled and, in the sulfuric acid solutions, it rapidly depolymerizes. Accordingly, it is ideal for obtaining the precise amount of anhydrous formaldehyde desired. Other sources of formaldehyde may also be used. For example, methylal, $CH_3OCH_2OCH_3$, may be successfully employed. There is no particular advantage in using this alternate formaldehyde source which yields formaldehyde upon its degradation in acid to methanol and formaldehyde.

The strength of the acid has a marked effect on the amount of product obtained in this reaction. Optimum yields are obtained in 90–96% sulfuric acid, due possibly to the greater insolubility of the formal in acid containing a small amount of water. The use of more highly concentrated sulfuric acid, such as 5% fuming $H_2SO_4$, may also produce good yields. It was found that the yields were optimized when the concentration of trinitroethanol in the acid was four moles alcohol per liter of acid (2.17 molal). At lower concentrations the yields dropped off and at higher concentrations, it is necessary to warm the alcohol-acid mixture to complete solution of the crystals, then cool to room temperature before adding the paraformaldehyde.

A reaction period of 30–60 minutes was found to be sufficient for virtual completion of the reaction. Prolonged reaction periods and heating of the solutions were ineffective in changing the yield appreciably.

It is apparent that this reaction is an equilibrium process and proceeds toward the formal product to a point at which the cleavage of the formal is in equilibrium with its formation.

TABLE I.—REACTION PARAMETERS FOR FORMATION OF BIS(TRINITROETHYL) FORMAL

| Alcohol/ HCHO ratio, moles | Alcohol conc., molal | $H_2SO_4$ acid strength, percent | Reaction period | Temperature | Yield, mole percent |
|---|---|---|---|---|---|
| .02/.01 | 2.17 | 80 | 1.0 hr | At room | 50 |
| .02/.01 | 2.17 | 90 | 1.0 hr | do | 91 |
| .02/.01 | 2.17 | 96 | 15 min | do | 87 |
| .02/.01 | 2.17 | 96 | 2 hrs | At 45° C | 83 |
| .02/.01 | 1.09 | 96 | 30 min | At room | 67 |
| .02/.01 | 2.97 | 96 | 30 min | do | 86 |
| .022/.01 [1] | 2.39 | 96 | 30 min | do | 93 |
| .2/.1 | 2.17 | 96 | 2 hrs | do | 88 |
| .2/.1 | 2.17 | 96 | 16 hrs | do | 90 |
| .02/.01 | 2.17 | 100 | 30 min | do | 77 |
| .04/.01 [2] | 2.17 | 100 | 30 min | do | 98 |
| .02/.02 [3] | 2.17 | 100 | 30 min | do | 81 |
| ([4]) | 2.17 | 100 | 30 min | do | 77 |
| .02/.01 [4] | 2.17 | ([5]) 5 | 30 min | do | 70 |
| .034/.01 [6] | 3.67 | ([5]) 5 | 30 min | do | 95 |
| .02/.01 | 2.17 | ([5]) 10 | 30 min | do | 58 |

[1] 10% excess TNEOH.
[2] 100% excess TNEOH.
[3] 100% excess HCHO.
[4] 400% excess HCHO.
[5] Fuming.
[6] 70% excess TNEOH.

The effect of acid strength on yields of the trinitroethyl formal is shown in Table II.

TABLE II $H_2SO_4$ acid strength:    Percent yield (2.17 molal trinitroethanol)
- 80% — 50
- 90% — 87
- 96% (concentrated commercial) — 89
- 100% — 77
- 5% $SO_3$ in $H_2SO_4$ — 70
- 10% $SO_3$ in $H_2SO_4$ — 58

It can be seen that for the 2.17 molal trinitroethanol solution, commercial concentrated sulfuric yields the best results. Conversely, it has been found that when 96% sulfuric acid is employed the molal concentration of the trinitroethanol solution which optimizes the result is about 2. A one molal solution yields about a 67% of theoretical.

The bis(trinitroethyl) formal is quite stable under acidic conditions which would hydrolyze ordinary acetals. Efforts were made to determine the degree of hydrolysis under severe conditions. Under one extreme condition, when the formal was held at reflux temperature of aqueous methanol saturated with HCl for 100 hours, the losses were but a few percent. This unusual stability to acids is not an exception to the general rule that acetals are quantitatively hydrolyzed by acid catalysts but is an example of the reversal of the equilibrium between an acetal and its cleavage products.

Under basic conditions, degradation of the nitroethyl formal did take place but it involved the nitrocarbon groups rather than the acetal grouping.

Bis(trinitroethyl) formal has unusual thermal stability when tested according to standard tests. When heated above its melting point it did not show the characteristic instability of many explosives. At 100° C. the formal evolved only 3.4 cc. of gas per gram over a period of seven days, and only 1.6 cc. of gas per gram at 90° C. in six days. This unusual stability in the non-crystalline state promotes excellent thermal stability of those compositions in which it is dissolved. For example, a composition containing 22.5% of this formal, 49.8% of trinitroethyl orthocarbonate (described in U.S. patent application Ser. No. 626,549 of Marion E. Hill, filed Dec. 5, 1958, and of common assignment) and 28.7% gun cotton evolved 0.74 cc. of gas per gram at 100° C. in 48 hours.

The physical properties of the trinitroethyl formal are summarized in Table III.

TABLE III.—PROPERTIES OF BIS(TRINITROETHYL) FORMAL (TEFO)

| | |
|---|---|
| Melting point | 65.3–65.4° C. |
| Vacuum stability | 1.60 cc./g./6 days at 90° C. |
| Impact sensitivity (50% height, 2.5 kg. weight, bare tools). | 18 cm. (number is dependent upon particle size; RDX–50 cm. with bare tools). |
| | 269 cm. (as 30% TEFO/alcohol solution). |
| | 210 cm. (damp with water). |
| Crystal density | 1.72. |
| Heat of formation | –103 kcal./mole (RDX- +14 kcal./mole). |
| Solubility | Soluble: hexane, pentane; very soluble: chloroform, methanol. |

The trinitroethanol (TNEOH) employed in Equation 2 produced the trinitroethyl formal and may be prepared by any suitable method such as, for example, by simultaneous acidification and formulation of sodium nitroform in a methanol water solution.

The crude alcohol separates as an oil which is a mixture of the alcohol monohydrate with methanol, water and other impurities. Drying of the trinitroethanol oil leads to greater yields of the formal in the synthesis of Equation 2.

In order to eliminate the alcohol drying step and to make it more practical to practice Equation 2 for the preparation of formals on a continuous industrial type process, a two-phase system consisting of an alcohol-solvent phase and a sulfuric acid-paraformaldehyde phase may be utilized. This system has several advantages: (1) the alcohol can be completely or only partially dried in the solvent and used without isolation, (2) the system is adaptable to continuous processing of the reaction components end products, (3) it provides a means of overcoming the equilibrium by continuous extraction of the product from the sulfuric acid reaction medium by the organic solvent.

It has been found that in order to employ the two-phase system to produce satisfactory yields, it is usually desirable to dry the crude trinitroethanol oil in solution until at least the monohydrate of the alcohol is reached. The continuous production of bis(trinitroethyl) formal may be accomplished by continuous addition of a methylene chloride solution of trinitroethanol monohydrate and sulfuric acid solution of paraformaldehyde to a reactor with continuous take off to a separator.

Equation 3 illustrates the reaction sequence. For instance, continuous addition of a methylene chloride solution of trinitroethanol monohydrate and sulfuric acid

TABLE IV.—PREPARATION OF BIS(TRINITROETHYL) FORMAL IN TWO-PHASE SYSTEMS

| Alcohol (plus equivalent HCHO) | Solvent phase | Acid phase | Reaction period | Yield percent |
|---|---|---|---|---|
| 10 g. "TNEOH oil" (6.3 g. TNEOH) | 10 ml. 2CH$_2$Cl$_2$ | 8.6 ml. 5% fuming H$_2$SO$_4$ | 16 hr. at room temp | 67 |
| Do | 10 ml. CHCl$_3$ | 9.0 ml. 96% H$_2$SO$_4$ | 4 hr. at room temp | 53 |
| 3.62 g. anhydrous TNEOH | 10 ml. CH$_2$Cl$_2$ | 5.0 ml. 100% H$_2$SO$_4$ | 15 min. at room temp | 80 |
| 3.62 g. TNEOH monohydrate | 10 ml. CH$_2$Cl$_2$ | 5 ml. 6% fuming H$_2$SO$_4$ | do | 76 | solution of paraformaldehyde to a reactor with continuous take off to a separator is feasible. Fortification and recycling of the acid and recycling of the methylene chloride mother liquors with additional trinitroethanol should permit efficient use of these components. In fact the entire synthesis from tetranitromethane is reasonably simple. The following reaction sequence incorporates the current experimental results:

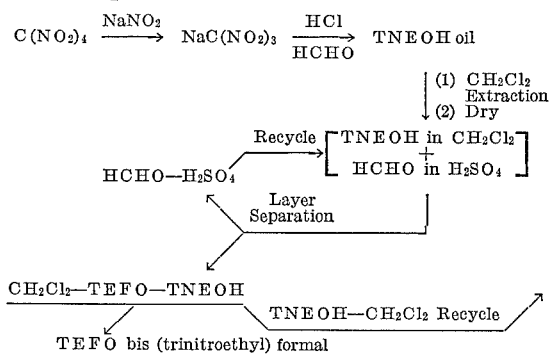

TEFO bis (trinitroethyl) formal

EXAMPLE II

A solution of 0.30 gram (0.01 mole) formaldehyde as paraformaldehyde in 5 ml. of 100% H$_2$SO$_4$ was prepared in a three neck round bottom flask fitted with a mechanical stirrer. To this solution was added a solution of 3.62 grams of trinitroethanol (TNEOH) in 10 mls. of methylene chloride; the resultant mixture was stirred rapidly for 15 minutes. The methylene chloride was separated from the sulfuric acid layer in a separatory funnel. The sulfuric acid layer was washed with 5 ml. of methylene chloride which was added to the methylene chloride layer. The methylene chloride was then removed by evaporation under reduced pressure, the residue washed with water, filtered and dried. The yield of crude product was 3.14 grams of 84% of theoretical. The melting point of the crude material was 60–61.5° C. Recrystallization from methanol-water gave a pure product which melted at 64–65° C. No additional product was obtained when the sulfuric acid was poured into ice water.

The results of varying the reaction conditions for the preparation of the formal in a two-phase system are shown in Table IV in column 6.

The processes illustrated by Examples I and II may be carried out with a variety of negatively substituted alcohols. The following examples illustrate the variety of formals which may be made by following the processes.

EXAMPLE IV

Preparation of bis(2,2-dinitropropyl) formal 2,2-dinitropropanol-1 (6.0 grams, 0.04 mole) was dissolved in 5 ml. of concentrated commercial sulfuric acid, "96%." At room temperature, 0.60 gram, 0.02 mole of formaldehyde as paraformaldehyde was added and the mixture stirred for two hours. During the reaction period an oil separated from the reaction medium. The entire reaction mixture was poured onto ice and water and the product which crystallized was isolated by filtration. Recrystallization from 75% methanol-water gave 4.35 grams, 70% of glistening white leaflets of bis(dinitropropyl) formal, M.P. 32° C.

EXAMPLE V

Preparation of bis(2,2-dinitropropyl) formal

A solution of 6.0 grams, 0.04 mole, of 2,2-dinitropropanol-1 in 10 ml. of methylene chloride was slurried vigorously with a solution of 0.6 gram, 0.02 mole, of paraformaldehyde in 4.5 ml. of commercial concentrated sulfuric acid, "96%," for 15 minutes. The methylene chloride layer was separated and combined with a methylene chloride solution used to extract additional product from the sulfuric acid. The methylene chloride was removed by evaporation under reduced pressure, leaving an oil which crystallized after seeding with known DNP formal. Recrystallization in the usual manner gave a 70% yield of pure product.

EXAMPLE VI

Preparation of 5,5-dinitro-1,3-dioxan

A solution of 3.32 grams (0.02 mole) 2,2-dinitro-1,3-propanediol in 5 ml. of concentrated (96%) sulfuric acid was prepared by stirring the mixture in a small (20 ml.) beaker with a magnetic stirrer. To this solution was added 0.60 gram (0.02 mole) formaldehyde as paraformaldehyde. The reaction mixture was stirred for one-half hour at room temperature. Crystals of product formed in the mixture within a few minutes after the paraformaldehyde dissolved. The reaction mixture was poured into flaked ice and the fine white product was filtered off, washed well with water and dried. The crude product weighed 2.99 grams or 84% of the theoretical. Recrystallization from methanol-water gave 2.47 grams of white needles which melted at 53° C.

EXAMPLE VII

Preparation of bis(2,2,2-trifluoroethyl) formal

A solution of 6.0 grams, 0.60 mole, of trifluoroethanol and 1.0 gram of paraformaldehyde in 5 ml. of 96% sulfuric acid was stirred for one hour. During this period an oil separated from the reaction solution. The product-reaction solution layers were poured into an ice and water mixture, and then extracted with ether. The ether was removed and the residual oil product was purified by distillation giving a 68% yield (4.35 grams). The product was characterized by a M.P. of −28° C. and a B.P. of 31° C. at 25 mm.

EXAMPLE VIII

Preparation of bis(2,2,3,3-tetrafluoropropyl) formal

By an identical procedure of Example VII, the preparation of bis(2,2,3,3-tetrafluoropropyl) formal was carried out with a yield of 63.4% of the formal. The product was characterized by a B.P. of 57–58° C. at 5 mm.

EXAMPLE IX

Preparation of bis(2,2,3,3-tetrafluoropropyl) formal

A solution of 19.8 grams, 0.15 mole, of 2,2,3,3-tetrafluoropropanol-1 in 15 ml. of methylene chloride was slurried at 0° C. with a solution of 2.10 grams, 0.07 mole of paraformaldehyde in concentrated H$_2$SO$_4$ for a period of two hours. The methylene chloride layer was combined with a methylene chloride extract from the sulfuric acid layer. The combined solution of product was extracted in turn with water, sodium bicarbonate solution, and then water. After drying the methylene chloride was stripped off and the residual product, purified by distillation, had a B.P. of 57–58° C. at 5.5 mm.

EXAMPLE X

Bis(2-chloro-2,2-dinitroethyl) formal

A solution of 8.5 grams (0.05 mole) of 2-chloro-2,2-dinitroethanol in 5 ml. of concentrated, "96%," $H_2SO_4$ was prepared in a 20 ml. beaker, 1.5 grams (0.05 mole) of formaldehyde, as paraformaldehyde, was added in small amounts with magnetic stirring. An oil formed in the mixture. The mixture was sitrred for one hour at room temperature, then poured over flaked ice. The mixture was extracted three times with 20 ml. portions of ether. The combined ether extracts were washed once with distilled water, three times with 15 ml. portions of cold 5% NaOH solution, again with 15 ml. of cold distilled water and dried over anhydrous $MgSO_4$. The ether solution was filtered and the ether removed by evaporation under reduced pressure leaving a faintly yellow oil which showed the characteristic infra-red absorption bands.

EXAMPLE XI

Bis(2-fluoro-2,2-dinitroethyl) formal

A solution of 9.0 grams (0.06 mole) of 2-fluoro-2,2-dinitroethanol in 5 ml. of "90%" $H_2SO_4$ was prepared in a 20 ml. Erlenmeyer flask. This solution was chilled in an ice water bath and 1.8 grams (0.06 mole) of paraformaldehyde was added rapidly with magnetic stirring. After the paraformaldehyde dissolved the reaction mixture was stirred at room temperature for an hour, then poured over flaked ice. An oil formed which was separated, dissolved in ether and the ether solution was washed four times with 10 ml. portions of 5% NaOH solution, four times with cold water and dried over anhydrous $MgSO_4$. The ether was removed by evaporation under reduced pressure at 50° C. leaving an almost colorless oil.

The foregoing illustrative examples should not be construed as limiting this process in any way. Although the reaction conditions may be varied by one skilled in the art to produce the optimum result, it should also be apparent that in order to produce sufficient quantities of the desired products the process may be practiced in other than the optimum manner. For example, the sulfuric acid solvent may vary in strength from one containing several percent of water to acids containing several percent $SO_3$. It is essential that the acid concentration remain above 80%, preferably between 90%–100%. Even after dilution by the water formed in the reaction of Equation 2, the minimum acid strength should preferably be at least about 80%. Other conditions such as temperature, concentrations of reactants, reaction time and reactants may be varied within wide limits within the purview of this invention. The reaction has proceeded at concentrations from 1 molal alcohol in acid to 24 molal, at temperatures from 0° C. to 100° C., for reaction periods from a few minutes to 48 hours; as outlined in the foregoing Tables I–III certain reaction parameters optimize the process but it should be apparent to one skilled in the art from merely scanning these tables that even if the process is practiced in a manner which is not the optimum mode, the product produced may still be satisfactory for many purposes.

The products obtained from this reaction may be isolated by slurrying a solution of the alcohol in a chlorinated solvent with a sulfuric acid solution of formaldehyde. As stated hereinbefore, the chlorinated solvent acts as a continuous extractor of the product and upsets the limiting equilibrium occurring in the acid solvent.

The alcohol may be introduced in the reaction as the crude product obtained directly from its preparation, as the dry alcohol, as the monohydrate of the alcohol or containing water in proportions which do not dilute the sulfuric acid unduly. Accordingly, this invention may be carried out in a broad range and is by no means limited to the optimum parameters as set forth hereinbefore.

Bis(trinitroethyl) formal is an extremely useful military high explosive. The compound has an unusually high oxygen content inasmuch as oxygen comprises 61% of the molecule, a feature not possessed by the conventional explosives. The favorable oxygen content is particularly useful in metallized explosive compositions. The nitro formals are used in mixtures with powdered aluminum in quantities sufficient to convert all its oxygen to aluminum oxide, $Al_2O_3$, and with other explosive compounds such as a 70/30 mixture with TNT. Also the compounds of this type such as the bis(trinitroethyl) formal and bis(dinitropropyl) formal dissolve in polymers which in themselves may or may not contain nitro groups. This unique feature of being soluble in polymers makes possible a whole new type of explosive composition, the "plastic soluble" explosives. In this system the explosive is in a continuous phase with the polymer and is not crystalline as in the conventional mixtures. By changing the relative percentage composition of the formals in the plastic, the trinitroethyl, dinitropropyl and fluoronitro formals are very useful in solid propellant compositions, either as an energy source or as a plasticizer. For instance, bis(trinitroethyl) formal dissolves in gun cotton in quantities up to 65%, and bis(dinitropropyl) formal dissolves in similar quantities. Similar mixtures can be made using polyurethanes or nitropolyurethanes.

A multicomponent mixture which is particularly useful in guided missile warheads to produce air blast is as follows:

| | Percent |
|---|---|
| Bis(trinitroethyl) formal | 36 |
| Trinitrobenzene | 10 |
| RDX | 22 |
| Aluminum | 31 |

Another mixture which is useful for underwater blast is as follows:

| | Percent |
|---|---|
| Bis(trinitroethyl) formal | 26 |
| Trinitrobenzene | 10 |
| RDX | 22 |
| Aluminum | 37 |
| Wax | 5 |

Although this invention has been described with reference to but a few preferred embodiments, it should be apparent that it is by no means so limited but, within the scope of the appended claims, it may be practiced in a manner other than that described.

What is claimed is:
1. Bis(trinitroethyl) formal.
2. Bis(2,2-dinitropropyl) formal.
3. Bis(2-fluoro-2,2-dinitroethyl) formal.
4. Bis(2,2-difluoro-2-nitroethyl) formal.
5. Bis(2,2,2-trifluoroethyl) formal.
6. Bis(2-chloro-2,2-dinitroethyl) formal.
7. A process for formal formation which comprises: dissolving a saturated aliphatic alcohol having 2–3 carbon atoms and containing no substituents other than at least two electronegative substituents taken from the group consising of Cl, F and $NO_2$ in sulfuric acid of at least 80% concentration, reacting formaldehyde with said alcohol in said acid at a temperature from about 0–100° C. to produce a formal and recovering said formal.
8. The process of claim 7 wherein said formaldehyde is in the form of paraformaldehyde.
9. The process of claim 7 wherein the concentration of the alcohol-acid solution is from about 1 molal to 6 molal.
10. The process of claim 9 wherein the formaldehyde is reacted with said solution for about 30 minutes to 48 hours.
11. The process of claim 7 wherein said alcohol is trinitroethanol.
12. The process of claim 7 wherein said alcohol is 2,2-dinitropropanol.

13. The process of claim 7 wherein said alcohol is 2,2-dinitro-1,3-propanediol.

14. The process of claim 7 wherein said alcohol is trifluoroethanol.

15. The process of claim 7 wherein said alcohol is 2,2,3,3-tetrafluoropropanol-1.

16. A process for producing a formal comprising: forming a first solution of formaldehyde in sulfuric acid of at least 80% concentration, forming a second solution of a saturated aliphatic alcohol having 2–3 carbon atoms and containing no substituents other than at least two electronegative substituents taken from the group consisting of Cl, F and $NO_2$ in methylene chloride, mixing said solutions at a temperature from about 0–100° C., separating said solutions, and recovering a formal from said second solution.

17. The process of claim 16 wherein said alcohol is trinitroethanol.

18. The process of claim 16 wherein said alcohol is 2,2-dinitropropanol-1.

19. The process of claim 16 wherein said alcohol is 2,2,3,3-tetrafluoropropanol-1.

20. A process for formal formation which comprises reacting 2,2-dinitropropanol with formaldehyde at a temperature from 0° to 100° C. in the presence of at least 80% sulfuric acid.

References Cited

UNITED STATES PATENTS

| | | |
|---|---|---|
| 2,227,128 | 12/1940 | Ellis. |
| 2,297,921 | 10/1942 | Senkus _____ 260—340.7 XR |
| 2,406,713 | 8/1946 | Senkus _____ 260—340.7 XR |
| 2,415,046 | 1/1947 | Senkus. |
| 2,796,423 | 6/1957 | Cottle et al. |
| 2,816,898 | 12/1957 | Lambrech _____ 260—340.7 |
| 3,129,250 | 4/1964 | Lawlor et al. |
| 3,291,833 | 12/1966 | Gold et al. |
| 2,519,540 | 8/1950 | Lionel et al. |
| 2,824,141 | 2/1958 | Zisman et al. |

OTHER REFERENCES

Kress Dyestuff Reporter, vol. 48, Feb. 23, 1959, page 33 relied upon.

HOWARD T. MARS, Primary Examiner

U.S. Cl. X.R.

149—88; 260—340.7, 632